April 2, 1968     C. R. ELLIS ET AL     3,375,750
THREE AXIS OPTICAL ALIGNMENT DEVICE
Filed Sept. 15, 1961     9 Sheets-Sheet 1

FIG. 1

INVENTORS
CHARLES R. ELLIS
BY ALLISTER L. BAKER
J. Russell Juten
ATTORNEY

*INVENTORS*
CHARLES R. ELLIS
ALLISTER L. BAKER
ATTORNEY

FIG. 9

INVENTORS
CHARLES R. ELLIS
ALLISTER L. BAKER

J. Russell Juten
ATTORNEY

April 2, 1968  C. R. ELLIS ET AL  3,375,750
THREE AXIS OPTICAL ALIGNMENT DEVICE
Filed Sept. 15, 1961  9 Sheets-Sheet 8

FIG. 12

INVENTORS
CHARLES R. ELLIS
ALLISTER L. BAKER
ATTORNEY

April 2, 1968  C. R. ELLIS ETAL  3,375,750
THREE AXIS OPTICAL ALIGNMENT DEVICE
Filed Sept. 15, 1961  9 Sheets-Sheet 9

FIG. 13

INVENTORS
CHARLES R. ELLIS
ALLISTER L. BAKER
J. Russell Juten
ATTORNEY

United States Patent Office 3,375,750
Patented Apr. 2, 1968

3,375,750
THREE AXIS OPTICAL ALIGNMENT DEVICE
Charles R. Ellis, Andover, and Allister L. Baker, Denville, N.J., assignors to Keuffel & Esser Company, Hoboken, N.J., a corporation of New Jersey
Filed Sept. 15, 1961, Ser. No. 138,525
6 Claims. (Cl. 88—14)

This invention relates to electro-optical systems and methods for determining and checking the deviations in the relative orientations of a plurality of points on one body or of a plurality of bodies or surfaces with respect to one another or with respect to a datum or with respect to a control check body, and refers, more particularly, to electro-optical means, methods, and systems for determining and checking the deviations of bodies about an axis coincident with, or parallel to, the optical line of sight, and for determining and checking the deviations in the relative orientations of bodies about three mutually perpendicular axes.

In prior art, electro-optical means and optical means are known which check deviations of bodies by having a light beam directed to fall on a prism, and having the light which falls on different sides of the prism directed to fall on different photocells. The deviations of either the body to which the light source is connected or the body to which the sensing prism is connected will cause the light to fall in varying amounts on different sides of the sensing edge or different surfaces of the prism, in amounts which are a function of the relative deviations or movements. Light falling on the different prism surfaces then falls on the different photocells in amounts which are functions of the relative location of the light beam on the prism, which in turn is a function of the relative orientation of the body or bodies involved. These prior art systems determine deviations about two axes perpendicular to the optical path of the light beam striking the prism but do not give the deviation of the bodies about the actual axis or line of sight of the light beam which strikes the prism, nor do these prior art systems give deviations of the bodies involved about three mutually perpendicular axes.

The obvious disadvantages of these prior art systems is that it is not possible to completely determine the relative orientations or deviations of the bodies involved since, in general, in order to fully determine body positions it is necessary to determine deviations or orientation about three mutually perpendicular axes. A further disadvantage is that these prior art systems do not determine the deviation or orientation of the bodies about the optical line of sight itself.

An object of the present invention is to provide an electro-optical system for checking deviations of bodies about an axis coincident with or parallel to the line of sight of the electro-optical instrument itself.

Another object of the present invention is to provide an electro-optical system for checking deviations of bodies about three mutually perpendicular axes including an axis which is coincident with or parallel to the line of sight of the electro-optical system itself.

Another object is to provide an automatic rezeroing system for checking the electro-optical system itself.

A further object of the present invention is to provide an electro-optical system, electro-optical means, and electro-optical methods, for determining the orientation or relative orientation or deviation of one or more bodies about the optical line sight of the electro-optical instrument, and about three mutually perpendicular axes and wherein said electro-optical system does not have the disadvantages of prior art.

Other objects of the present invention will become apparent in the course of the following specification.

The objects of the present invention may be realized through the provision of an electro-optical system comprising means for receiving one or more light beams directed from another portion of the system, where said light beams fall on said receiving means as a function of the orientation of the body or bodies to which the receiving means and the light source are connected. The light receiving means is connected to an electric circuit, whereby electrical variations are introduced into the electrical circuit as a function of the quantity or location of the light falling on one or more of the receiving means, and consequently as a function of the deviation in relative orientation of the bodies to which the receiving means and light source are connected. The electrical circuit further comprises electrical apparatus for reading the variations in the circuit due to the variations in light falling on the receiving means and thus deviations in the relative orientation of the various bodies involved may be readily determined.

The invention will appear more clearly from the following detailed description when taken in connection with the accompanying drawings showing, by way of example, preferred embodiments of the inventive idea.

Figure 1:
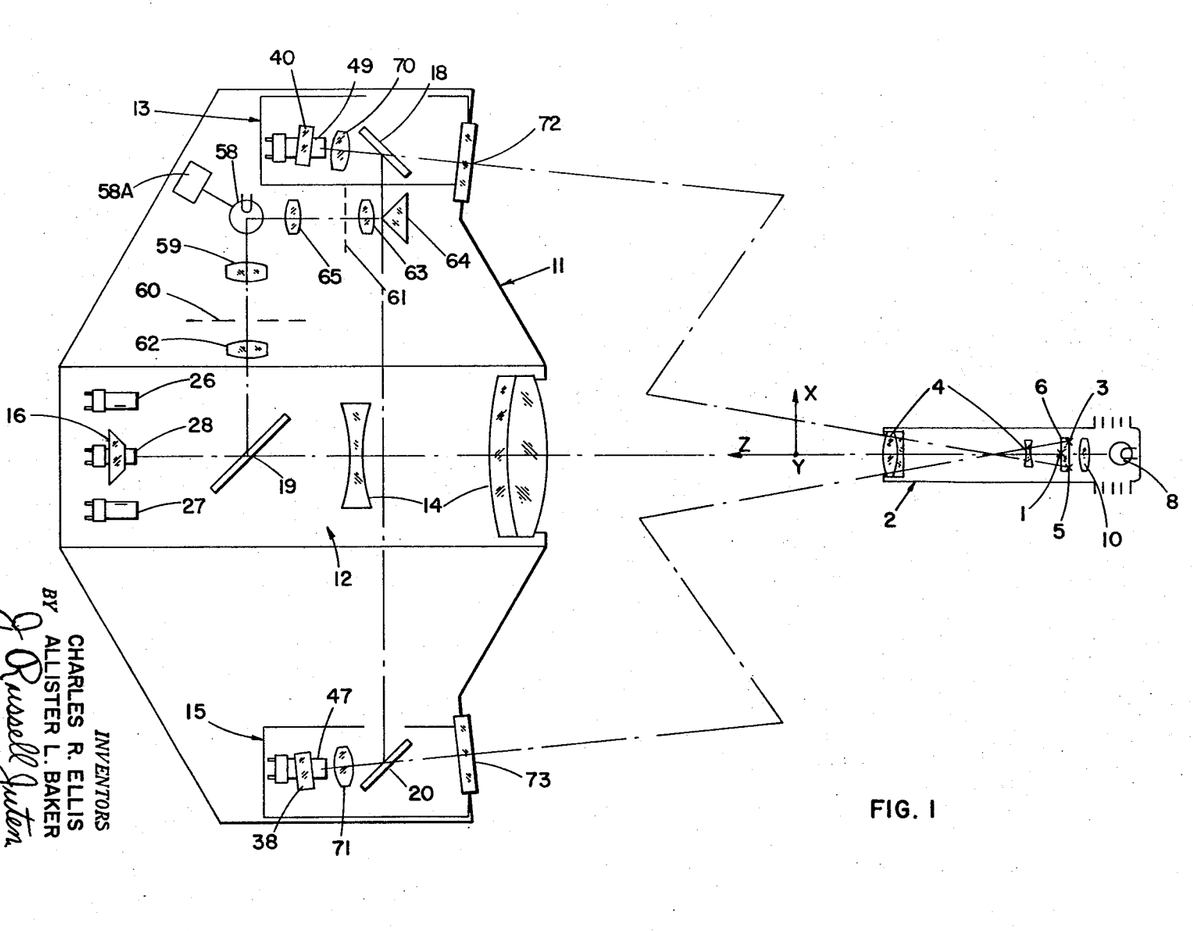
FIGURE 1 is a schematic plan view of an electro-optical system of the present invention for checking deviations.

An electro-optical system of the present invention for determining and checking deviations of one or more bodies or points is shown in schematic plan view in FIGURE 1, and is further shown in FIGURES 2, 3, 4A, 4B, and 4C, and comprises a projection instrument 2 which is essentially a collimator, and a sensor instrument 11 which comprises a receiving collimator 12 and two separated receiving units 13 and 15.

The projection instrument 2 is mounted at one of the two points between which the deviations are to be determined, and the sensor instrument 11 is mounted at the other of the two points. The projection instrument 2 and sensor instrument 11 may be connected to, or supported by, the body or bodies whose deviations or movements are to be determined, in any convenient manner.

Three mutually perpendicular axes X, Y and Z are shown in FIGURE 1, and this set of coordinate axes may be defined as follows: X is in the plane of the drawing perpendicular to the line of sight, Y is perpendicular to the plane of the drawing and perpendicular to the line of sight, and Z is coincident with or parallel to the optical line of sight of collimator projection instrument 2.

Receiving collimator 12 checks deviations about the X and Y axes, while receiving units 13 and 15 check deviation about the Z axis.

For purposes of illustration herein, it will be assumed that sensor instrument 11 is fixed and that any movements, rotations, or deviations are caused by movement of projection instrument 2 and the body supporting it. Of course it should be realized that either instrument 2 or instrument 11, or both, could undergo the various movements or deviations discussed.

The projection instrument 2 comprises a lamp 8, a condenser lens 10, a reticle 6, and objective lens 4.

Figure 3:
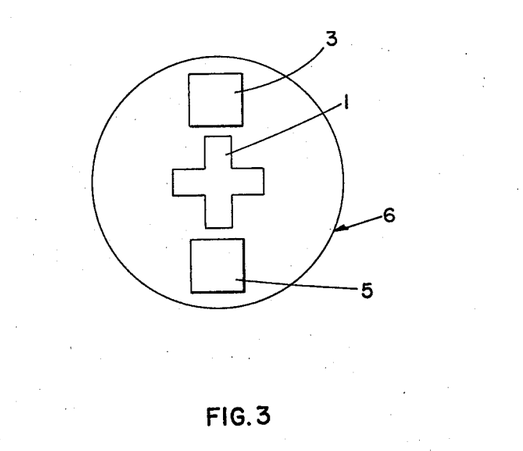
FIGURE 3 is an end view of reticle utilized in the projection instrument of the electro-optical system of FIGURE 1.

As may be seen in FIGURES 1 and 3, the reticle 6 is provided with slits located at two different focal planes. Slit 1, which is in the shape of a cross, is at the principal focus of the lens 10 and provides truly collimated light. Slits 3 and 5 are at a conjugate distance corresponding to the fixed distance between the points whose relative deviations are to be determined. The reticle 6 is illuminated by lamp 8 and condenser lens 10.

Figure 2:
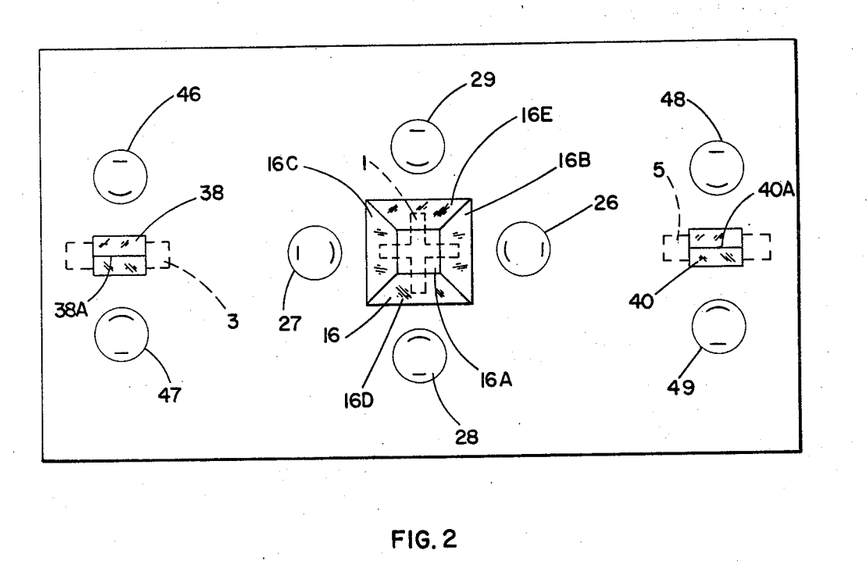
FIGURE 2 is a partial horizontal sectional view of the electro-optical system of FIGURE 1 showing the light-beam receiving means comprising optical elements and photoelectric means.

The receiving collimator 12 which checks deviations about the X and Y axes, comprises objective lens 14, beam splitting pellicle 19, square base pyramidal prism 16 which is mounted at the principal focus of the objective 14, and two pairs of photocells 26, 27; and 28, 29.

The cross shaped slit 1 of reticle 6 of projection instrument 2 is focused on the truncated end 16A of prism 16 as shown in FIGURE 2. The ends of the image of the cross overlap the end 16A of the prism 16 and are reflected by the inclined prism surfaces 16B, 16C, 16D, and 16E so as to strike the photocells 26, 27, 28, and 29.

Thus light from lamp 8 passes through condenser lens 10, slit 1 of reticle 6, objective lens 4 of projection instrument 2, objective 14 of the receiving collimator 12, and beam splitting pellicle 19, and strikes the prism 16, whereupon the end portions of the image of the cross slit 1 which fall on the inclined prism surfaces 16B, 16C, 16D, and 16E are reflected to strike the corresponding photocells 26, 27, 28, and 29. Therefore, any variation or deviation in orientation about the X and Y axes between the projection instrument 2 which is supported by one of the bodies whose orientation is being determined, and the receiving collimator 12 which is supported by the second of the bodies whose orientation is being determined, will cause the beam of light from lamp 8 which passes through slit 1 to strike the prism 16 at a different position thereby causing differences or variations in the amount of light which strikes the photocells 26, 27, 28 and 29.

Slits 3 and 5 of reticle 6 of projection instrument 2, are focused on screens 73 and 72, respectively, of receiving units 15 and 13. The receiving unit 15 comprises screen 73, beam-splitter 20, lens 71, knife edge prism 38, and photocells 46, 47, while the receiving unit 13 comprises screen 72, beam-splitter 18, lens 70, knife edge prism 40, and photocells 48 and 49. Lens 71 images the image of slit 3 in reduced size against the knife edge 38A of the knife edge prism 38 which divides the light of the image of slit 3 and directs it to the pair of photocells 46 and 47. The image of slit 5 is utilized in a similar manner and passes through a similar optical path and is focused on knife edge 40A of knife edge prism 40 which divides the light of the image of slit 5 and directs it to the pair of photocells 48 and 49. If desired, the photocells 46, 47, 48, and 49 may be photo-multipliers.

If, for example, projection instrument 2 rotates about the X axis in a given direction the output of photocell 28 will increase and the output of photocell 29 will decrease. This is so since a rotation of projection instrument 2 about the X axis will, for example, cause the image of the slit 1 of reticle 6 to be lowered on the prism 16 with respect to the square end 16A. Therefore, while there will be no difference in the amount of light falling on the surfaces 16B and 16C, there will be a greater amount of light falling on the surface 16D and a lesser amount of light falling on the surface 16. Therefore, a greater amount of light will strike the photocell 28 and a lesser amount of light will strike the photocell 29. Thus, rotation of the projection instrument 2 about the X axis will be detected in the electrical circuit shown in FIGURE 4A which compares the output of cell 28 with the output of photocell 29.

In a similar manner rotation of the projection instrument 2 about the Y axis will, for example, result in a greater amount of light falling on the surface 16B and a lesser amount falling on the surface 16C, whereupon more light will strike photocell 26 than will strike photocell 27. The rotation about the Y axis will be detected by the electrical circuit shown in FIGURE 4B which compares the output of cell 26 with the output of photocell 27.

Rotation about the X axis will not change the output of the photocells 26, 27 which are used to measure rotation about the Y axis because of the cross-shaped form of the slit 1, and rotation about the Y axis will not change the output of photocells 28 and 29 which are used to measure rotation about the X axis for the same reason.

A deviation or rotation of the projection instrument 2 about the Z axis will twist the image of the cross slit 1 with respect to the square end 16A of the pyramidal prism 16 but will have merely a negligible effect on the outputs of any of the photocells 26, 27, 28 and 29 used to check rotation or deviation about the X and Y axes.

Assuming a clockwise rotation of instrument 2, when looking into the objective of instrument 2, about the Z axis which is either coincident with or parallel to the optical line of sight of the projection instrument 2, an increase in the outputs of cells 47 and 48 and a decrease in the outputs of photocells 46 and 49 will result. That this is true may be seen from the fact that light from lamp 8 passes through condenser lens 10, slit 3, telephoto objective 4, is imaged on screen 73, and passes through beam-splitter 20 and lens 71 to fall upon the knife edge prism 38. If the image of slit 3 on knife edge prism 38 is not perfectly centered on the knife edge 38A, but is, for example as in the case of the above assumption, somewhat off center in a direction below the knife edge 38A, more light will strike photocell 47 than will strike photocell 46. Similarly, the image of slit 5 falling on the knife edge 40A will be off center in an upward direction and will cause more light to fall upon photocell 48 than on photocell 49.

Figure 4A:
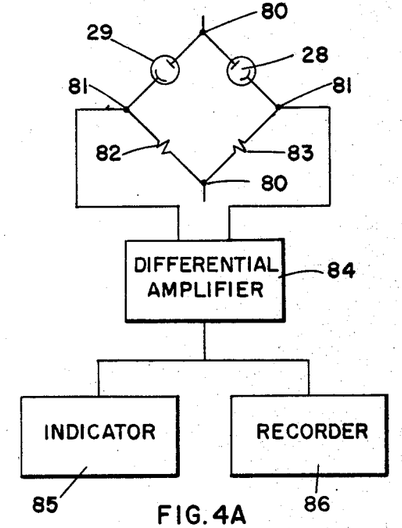
FIGURES 4A, 4B, 4C and 4D are electrical schematic diagrams showing the electrical circuits in the electro-optical system of FIGURE 1.
Figure 4B:
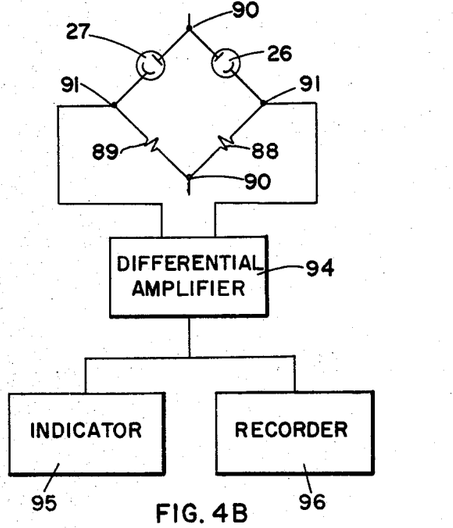
Figure 4C:
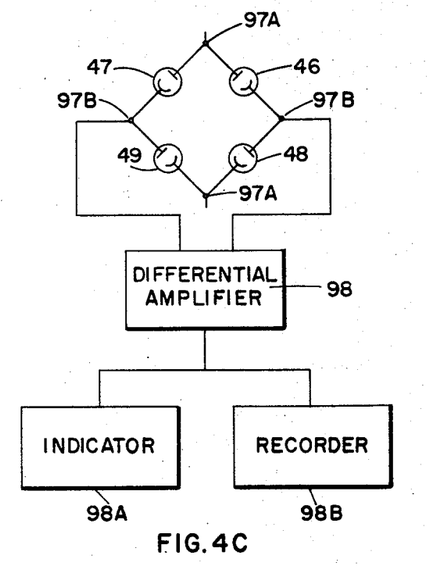
Figure 4D:
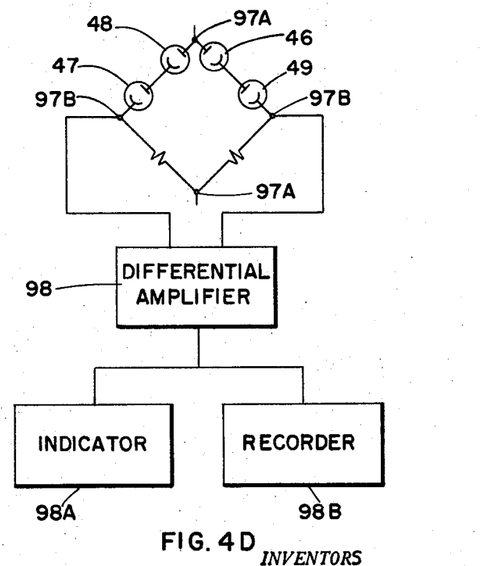

As may be seen in the electrical schematic diagram FIGURE 4C, the photocells 46, 47, 48, 49 are connected in a manner such that the electric circuit will detect deviation about the Z axis in a similar manner to that in which the previously described electrical circuits detect rotation about the X and Y axes. An alternative electric circuit for determining deviation about the Z axis is shown in FIGURE 4D.

Rotational deviation of projection instrument 2 about the Y axis will not effect the outputs of the photocells used to monitor deviation about the Z axis. A rotation about the X axis may, for example, increase the outputs of photocells 46 and 48 while decreasing the outputs of photocells 47 and 49. Such a change will be neutralized in the electrical circuits because of the manner of placing photocells 46, 47, 48 and 49.

The electrical circuitry is shown in FIGURES 4A, 4B and 4C. FIGURE 4D shows an alternative to FIGURE 4C.

Photocells 28, 29 and resistances 82, 83 are shown in an electrical bridge in FIGURE 4A, wherein points 80 are the bridge input points, while points 81 are the bridge output points. The output points 81 of the bridge are connected to differential amplifier 84 which in turn is connected to indicator 85 and recorder 86. As previously discussed, rotation of the projection instrument 2 about the X axis results in a change of light intensity falling upon photocells 28 and 29. This change in light intensity results in a variation of voltage across the bridge, and the bridge voltage difference is fed to the differential amplifier 84 and is indicated on the indicator 85 and recorded by the recorder 86. The indicator 85 is calibrated to indicate voltage difference across the bridge in terms of angle of rotation about the X axis and further indicates whether the quantity of light falling on photocell 29 is greater than that falling on photocell 28, or vice versa, thereby indicating the direction of rotation about the X axis.

Photocells 26, 27 and resistances 88, 89 are shown in a bridge in FIGURE 4B, wherein points 90 are the bridge input points, and the bridge output points 91 are connected to a differential amplifier 94 which in turn is connected to indicator 95 and recorder 96. The circuit of FIGURE 4B indicates the amount and direction of deviation or rotation of the projection instrument 2 about the Y axis in a manner similar to that described for the X axis with respect to FIGURE 4A.

The circuitry for determining the rotation about the Z axis is shown in FIGURE 4C, wherein it may be seen that photocells 46, 47, 48, 49 are in a bridge circuit. The points 97A are bridge input points while the output points 97B are connected to a differential amplifier 98 which in turn is connected to an indicator 98A and the recorder 98B. This electrical circuitry allows the differential amplifier 98 to read the voltage differences across the output points 97B of the bridge and thereby determine the amount of rotation about the Z axis while the indicator 98A makes it possible to determine the direction of this rotation.

Thus it may be seen that the present invention as shown in FIGURES 1 through 4 allows a direct reading of the relative deviations or rotations of one or more bodies about three mutually perpendicular axes X, Y, and Z and that by means of the bridge circuitry involved, rotation about one axis does not affect the readings of the rotation about the other axes. The circuitry involved also enables the rotations about the three axes to be automatically read and recorded.

The present invention further comprises automatic checking circuitry for all planes, to compensate for drifting or aging of the photocells.

In the case of the X and Y axes, this is accomplished by means of a reference reticle 60 which is imaged on the pyramidal prism 16 by means of lens 62 and beam-splitting pellicle 19. The reticle 60 is illuminated by the lamp 58 through the condenser lens 59.

In the case of the Z axis, light from lamp 58 passes through condenser lens 65 and illuminates reticle 61 which is imaged on the two knife edge prisms 38 and 40 by the lenses 63 and 70, 71 and prism 64 and the beam-splitters 18 and 20. Preferably, the paths from lens 63 to prisms 38 and 40 are made equal by mounting the lamp 58 and associated optics above the sensor instrument 11, and the elements of the automatic checking circuitry are shown to one side on the drawing of FIGURE 1 for purposes of illustration only.

The automatic checking circuitry operates somewhat as follows: The lamp 58 is energized at predetermined intervals by a timing device control 58A to automatically re-zero all three bridge circuits of FIGURES 4A, 4B and 4C. During this re-zeroing operation, the timing device control 58A will also shut off lamp 8 while the lamp 58 is on. After completion of the re-zeroing operation, the lamp 58 will be shut off and the lamp 8 will be automatically re-energized. The time required for this re-zeroing will be only a fraction of a second and the operation is performed at any desired time interval depending upon the amount of drift encountered in the photocells and the accuracy required. Thus, while the lamp 8 is shut off and the lamp 58 is on, there should be no voltage output in the electrical circuits since the lamp 58 and the reticles 60 and 61 are so calibrated and placed with respect to knife edge prisms 38 and 40 and prism 16 that equal amounts of light will fall upon the corresponding sets of photocells 26, 27; 28 and 29; and 46, 47, 48, and 49. Automatic sensing means (not shown) connected to the electrical circuits of FIGURES 4A, 4B, and 4C, senses if there is any voltage present in the output when lamp 8 is shut off and lamp 58 is on. If the output voltage is other than zero with lamp 58 on and lamp 8 off, the sensing means measures the voltage and automatically trims the bridge circuits involved to give a zero output voltage, and thereby re-zeros and calibrates the electrical system.

The above description of the re-zeroing operation is a description of how the re-zeroing and recalibration is done for a null situation, however, automatic recalibration at the range extremes is also provided by fixed constant angle signals generated by the outer slits in reticles 60 and 61. The outer slits in reticles 60 and 61 would normally be covered when performing the null re-zeroing and recalibration previously described. When range calibration is desired to be accomplished, the outer slits of reticles 60 and 61 are uncovered and light from these slits will then fall upon the various photocells involved. Since light from these slits has previously been calibrated by; uncovering the slits and passing light from lamp 58 therethrough, a recalibration of the photocell system at operating values can be determined.

The slit dimensions of reticle 6 must be large enough to cover the required range while maintaining some output from all photocells.

It should be noted that in reticle 6, the center cross slit 1 is on one side of reticle 6 and the two slits 3 and 5 are on the back side of the reticle 6. There will, of course, have to be light openings in the coating on the front side of reticle 6 larger than the slits 3 and 5 so that these slits can, in fact, be formed on the rear surface.

The electro-optical system of the present invention operates for a given fixed distance between the two bodies whose relative deviations are to be determined.

For different fixed distances between the bodies whose relative orientations are to be determined, the various units are not interchangeable unless the reticle and reticle dimensions are changed.

The sensitivity of the electro-optical system of the present invention is such as to meet very exacting measurement requirements.

By using photomultipliers instead of photocells in the electro-optical system of the present invention, one can obtain data in real time at frequencies up to 1000 cycles per second. These photomultiplier cells have frequency responses approaching the megacycle range, and unwanted higher frequency information can be filtered out.

The outputs taken directly from the bridge circuits are not linear when plotted with respect to the deviations or rotations about the corresponding axes. It has been found that in photomultiplier systems the output curve of voltage vs. angle of rotation may be modified by other effects such as aberrations in the optical system. This, however, can be empirically corrected by inserting a non-linear function generator between the output of the bridge circuit and the synchro-transmitter.

In an electro-optical system such as that of the present invention, both the accuracy at null and the accuracy of relatively large deviations from null must be considered.

The initial accuracy at null depends on the matching of the photocells or photomultipliers and the balancing of the electrical circuitry. The automatic zero resetting feature of the present invention assures that the static accuracy at null will be maintained well within present-day electro-optical tolerances.

The accuracy of the electro-optical system of the present invention over the remainder of the range will depend on the linearity to be obtained by means of the non-linear function generator. Static accuracy over the full range within present-day electro-optical tolerances can be obtained in this manner. The automatic recalibration feature of this invention will keep this within the required tolerance.

When photomultipliers are used, there is virtually no degradation in accuracy from static conditions to well beyond 1000 cycles per second.

It should be noted that it is important that the lines of sight, particularly for the Z axis monitoring, should be enclosed. Stray light should not be permitted to fall on the screens 72 and 73, and elimination of air currents is also achieved by enclosing the lines of sight. Thus, by enclosing the lines of sight, noise due to stray light or air currents may be eliminated.

Another source of noise can be high-frequency vibrations of the bodies whose deviation is being determined. These high frequency vibrations will be picked up by photomultipliers or photocells but can be filtered out electronically with a sharp cut-off filter. Other sources of noise coming from the electronics or the input frequency can be eliminated in the circuitry.

Figure 5:
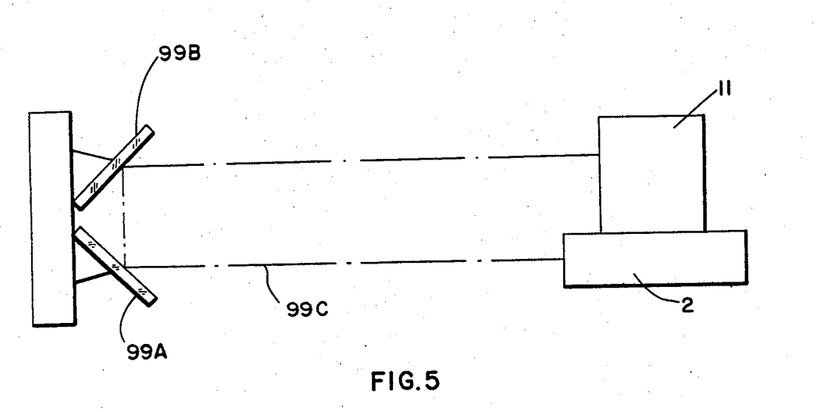
FIGURE 5 is a schematic of another embodiment of the present invention.

If desired the electro-optical device shown in FIGURE 1 may be put into one instrument as shown in FIGURE 5 comprising the projection instrument 2 and the sensor instrument 11. In this way, the instrument as shown in FIGURE 5 would be supported by one of the bodies whose relative deviation is to be determined while mirrors 99A and 99B would be connected to the second body whose deviation is to be determined. The path of collimated light 99C emitted from the projection instrument 2 in FIGURE 5 would be reflected from the mirrors 99A, 99B, back into the sensor instrument 11. Otherwise the operation of the sensor instrument 11 would be the same as the operation of the instrument shown in FIGURES 1 through 4.

Figure 6:
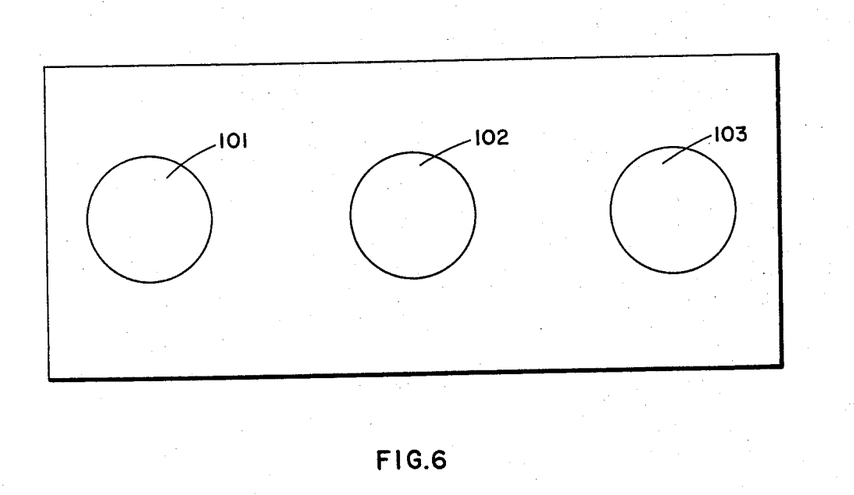
FIGURE 6 is a partial horizontal sectional view of an electro-optical system of the present invention wherein lateral effect photocells are used in place of some of the optical elements and photocells of the embodiment of FIGURE 1.

Another embodiment of the electro-optical system of the present invention may be achieved as shown in FIGURE 6 which is a partial horizontal view of the sensor instrument, by using lateral effect photocells 101, 103, 102 in place of the receiving units 13 and 15, and prism 16 and its accompanying photocells 26, 27, 28 and 29, respectively, of FIGURE 1. The use of lateral effect photocells 101, 102 and 103 simplifies the optical system required in the sensor instrument 11. The projection instrument in this case would remain the same as in FIGURE 1.

Lateral effect photocells 101, 102 and 103, do not sense the intensity of light falling thereupon. They sense the location of the point on the cell which receives the light and, therefore, these lateral effect photocells enable one to determine the coordinates of the point on the photocell which is hit by the light and consequently to determine the direction from which the light striking the photocell is coming. Photocells of this type were described in the magazine "Electronics"—McGraw-Hill, issue of July 1, 1961, page 165, in an article by J. T. Wallmark, entitled, "Photocell Measures Light Direction."

When utilizing lateral effect photocell 102 for determing the rotation about the X and Y axes, the cross-shaped slit 1 of FIGURE 3 is replaced by a circular slit. The position of the image of the circular slit on lateral effect photocell 102, gives X and Y voltages, which determines the location of the image of the circular slit on the photocell 102 and which in turn determines the deviations of projection instrument about the X and Y axes, with respect to the sensor instrument.

Figure 7:
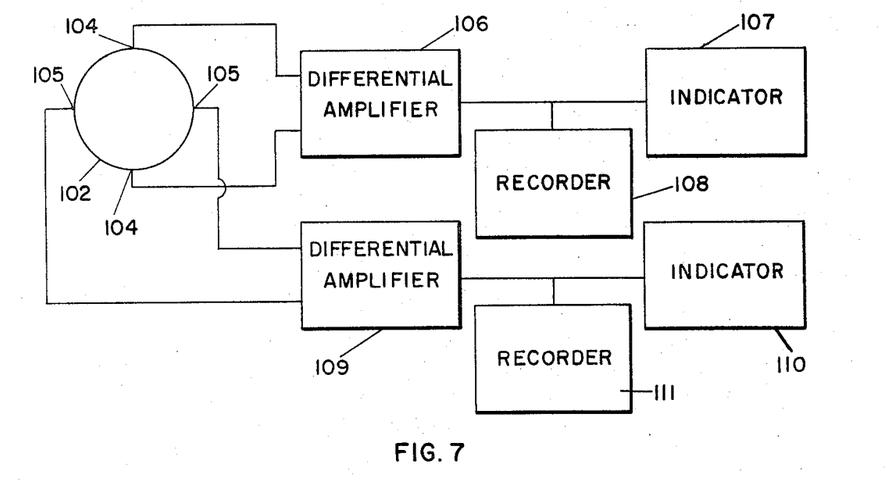
FIGURES 7 and 8 are electrical schematic diagrams showing the electrical circuits in the embodiment of FIGURE 6.

Electrical circuitry which may be used when determining the X and Y deviations with lateral effect photocell 102 is shown in FIGURE 7, wherein is shown lateral effect photocell 102 with its X output leads 104 and its Y output leads 105. The X output leads 104 are connected to a differential amplifier 106, which in turn is connected to an indicator 107 and recorder 108. Indicator 107 and recorder 108 indicate and record the deviation or rotation about the X axis. The Y output point 105 are connected to differential amplifier 109 which in turn is connected to indicator 110 and recorder 111. The indicator 110 and recorder 111 indicate the rotation about the Y axis.

It should be noted that one can replace the two recorders 108 and 111 by and X–Y plotter recorder, whereby one can obtain vector movement. This vector movement would represent the vector summation of the rotations about the X and Y axes.

Figure 8:
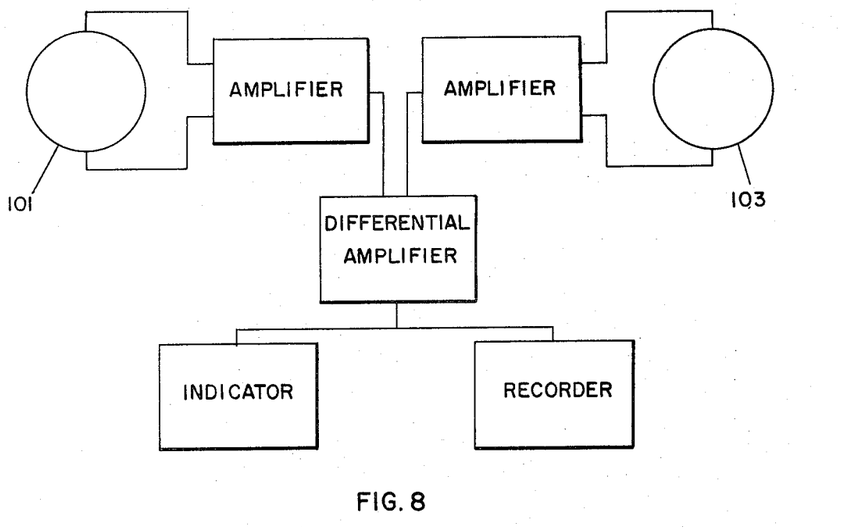

Electric circuitry of which lateral effect photocells 101 and 103 are a part in order to determine the rotation or deviation about the Z axis is shown in FIGURE 8. If light falling on the lateral effect photocells 101 and 103 moves the same way there is no voltage change across the circuit, while there is voltage change across the circuit when there is a movement of light on one of the lateral effect photocells relative to light movement on the other lateral effect photocell.

Thus it can be seen that by utilizing lateral effect photocells, one can use the electro-optical device of the present invention to determine the rotation about the three mutually perpendicular axes X, Y and Z through the use of only three photocells and their accompanying circuitry.

The porton of the electro-optical system which measures the deviation about the Z axis is an electro-optical device which measures relative angular rotation about the line of sight and which requires only an optical path along the axis of rotation, which in this case is the Z axis. The two beams of light emerging from the projection instrument strike the sensing units, and the relative angular rotation about the light beam is indicated on a linear meter scale.

Power supply amplifiers as described above supply the necessary voltages to operate the equipment and contain the circuitry which converts the output of the sensor to an output which is a linear function of the torsional angle. The indicator provides a read-out of torsion and allows selection of the angular range most useful in any particular application.

It should also be noted that the electro-optical system of the present invention may be employed as a transducer of torsional angular variations or other variations, and can be placed in a servo system in which case the output of the transducer is an error signal which causes a mechanism to correct the error.

Figure 9:
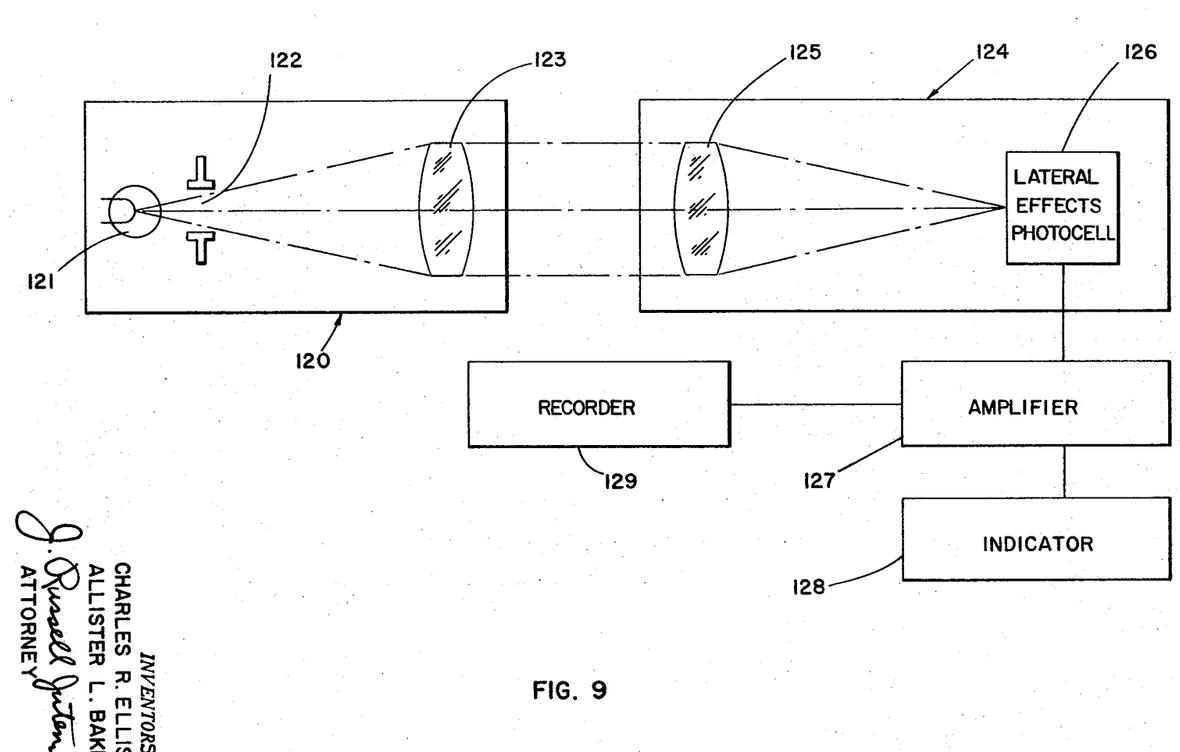
FIGURE 9 is a schematic diagram of the invention using a single lateral effect photocell for determining the deviation with respect to two axes.

Another embodiment of the present invention utilizing a lateral effect photocell to measure deviation about the X and Y axes as shown in FIGURE 9 and comprises a collimator 120 which comprises a lamp 121, an aperture 122, and an objective lens 123; and a second collimator 124 comprising an objective 125 and a lateral effect photocell 126' which is connected to amplifier 127, which in turn is connected to indicator 128 and recorder 129.

The collimator 120 is supported by one of the two bodies whose relative deviations about the X–Y axes are to be determined, and collimator 124 is supported by the other body.

Light from lamp 121 passes through aperture 122 and through objective 123. After leaving objective 123, the light is collimated light and strikes objective 125 whereupon it is concentrated at a point on the lateral effect photocell 126. This is an anti-parallel collimated system wherein two collimators are directed toward one another. A variation in relative orientation between the collimators 120 and 124, and consequently a variation in relative orientation between the bodies supporting these collimators, causes the light to be focused upon a different point on the lateral effect photocell 126. As previously explained, as the point of light falling on the lateral effect photocell 126 moves, a voltage differential is created which, through amplifier 127, is indicated on the indicator 128 and recorded on the recorder 129.

Thus the invention can determine rotation about two perpendicular axes which are perpendicular to the line of sight. The angular position of the monitored object is equal to the angle of the light entering the photocell collimator 124. The collimators 120 and 124 are essentially telescopes with the lateral effect photocell 126 being mounted at the focal point of the collimator or telescope 124. The photocell 126 can be so oriented as to align the axes of the optical system with the axis of the body or bodies whose relative orientation is to be determined.

Figures 10, 11:
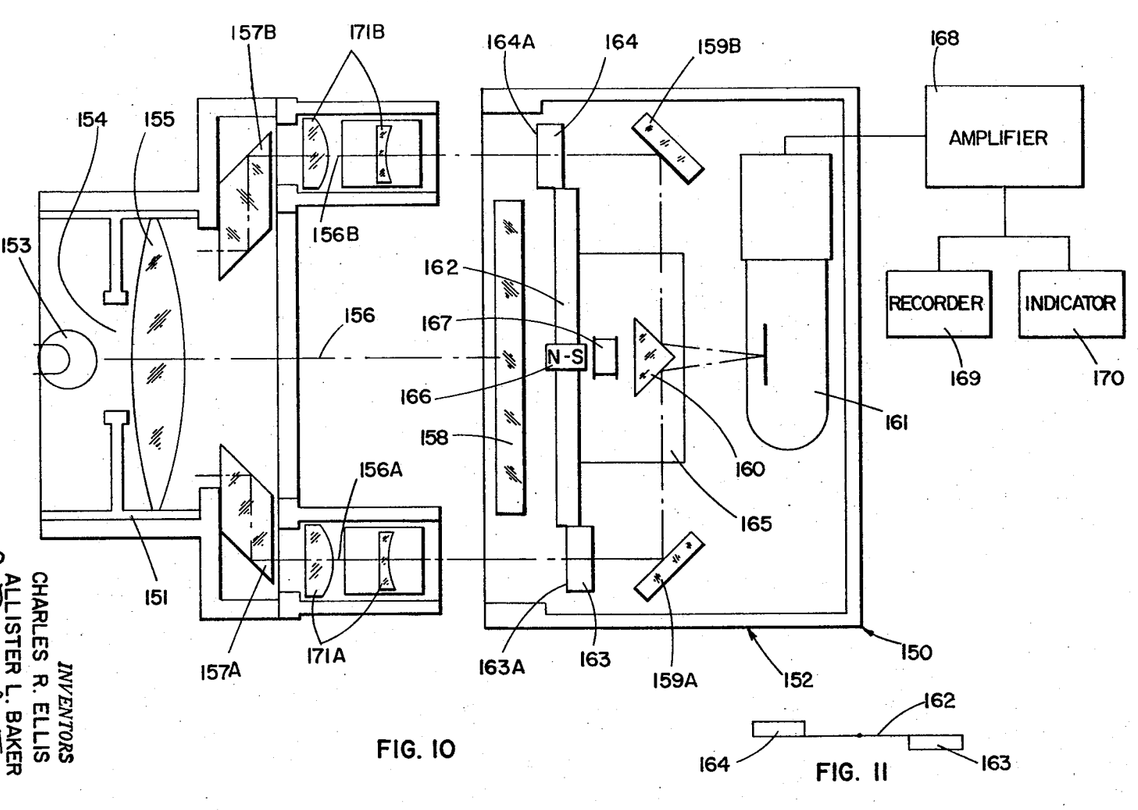
FIGURE 10 shows an electro-optical system of the present invention for checking deviations about one or more of three mutually perpendicular axes.
FIGURE 11 shows the scanner and arms of FIGURE 10.

Another embodiment 150 of the present invention is shown in FIGURE 10 and comprises a collimator 151 which is supported by one of the two bodies whose relative orientation is determined, and a sensor instrument 152 which is supported by the other body whose relative orientation is to be determined. The collimator 151 comprises a source of light 153, an aperture 154 through which the light passes and a lens 155 for forming collimated light. The light which is collimated leaves the collimator 151 in three portions, 156, 156A and 156B. The portions of the collimated lights 156A and 156B are passed through rhomboid prisms 157A and 157B respectively, and converging lenses 171A and 171B, respectively.

The sensor instrument 152 comprises a silvered reflecting mirror 158 which is situated in the path of the portion of collimated light 156, and optical reflecting means 159A and 159B which lie in the path of the light beams 156A and 156B, respectively. The sensor instrument 152 further comprises a prism 160 and a photomultiplier 161 or other photoelectric cell. A light scanner or light chopper 162 having two scanner arms 163 and 164, is driven by a motor 165 such that the scanner arms 163 and 164 rotate about an axis perpendicular to the beams of light 156A and 156B. The scanner arms 163 and 164 each resemble one-half of a cylinder cut lengthwise and are situated on opposite sides of the scanner shaft with the flat cylinder cross-sections facing the shaft.

Attached to the scanner shaft is a magnet 166 with north-south poles and which is disposed adjacent to an armature 167.

The purpose of magnet 166 is to determine the position of the scanner arms 163, 164 with respect to the light beams 156A and 156B. The scanner arms 163 and 164 are so placed on the scanner with respect to one another that when the flat surface of 163, for example, is horizontal, the flat surface of 164 is also horizontal, both lying in the same plane with, for example, the entire volume of 163 being above said plane and the volume of 164 below said plane. In this manner, the edges of the flat surfaces of the arms 163, 164 act as sensing edges 163A, 164A with respect to light beams 156A, 156B.

The photomultiplier 161 is part of an electric circuit which comprises an amplifier 168, recorder 169 and indicator 170.

The manner of use and operation of the electro-optical system of embodiment 150 is somewhat as follows:

With the collimator 151 supported on one of the bodies and sensor instrument 152 supported on the second of the bodies whose relative deviations about three mutually perpendicular axes is to be determined, light from light source 153 passes through aperture 154 and thence through lens 155. The portion of the collimated light 156 strikes the silvered reflector mirror 158 which is part of the sensor instrument 152, and is utilized to determine rotation about the X and Y axes. The light 156 is reflected from the mirror 158 back toward the collimator 151. The determination of the deviation about the X and Y axes can then be made by utilizing either optical collimation procedures by comparing the aperture or reticle image reflected off the mirror 158 with the aperture or reticle itself, or may be made by projecting the reflected image onto a knife edge (not shown) which is utilized in conjunction with photoelectric means as is shown and described in the receiving collimator 12 of FIGURES 1 and 2.

To determine the deviation about the Z axis, part of the collimated light is passed through the rhomboid prisms 157A and 157B respectively from which it is transmitted through the lens systems 171A and 171B respectively, which lens systems are so constructed that the light is caused to be focused on reflector 159A and reflector 159B, respectively. Light reflected from reflectors 159A and 159B is reflected to prism 160 from which it is further reflected and focused at a point on the photomultiplier 161.

Before light beams 156A and 156B can reach the reflectors 159A and 159B, it is necessary that they pass the scanner arms 163 and 164.

When the device is in operation a motor 165 drives the scanner 162 and consequently the scanner arms 163 and 164 about an axis normal to the light beams and lying in the plane of the drawing of FIGURE 10.

If there is no deviation about the Z axis the light beams 156A and 156B would be bisected by the sensing edges 163A and 164A of scanner arms 163 and 164, respectively, when the sensing edges are in the plane of the drawing. The light beam images are rectangles at the plane of the scanner 162 with the longer edges being perpendicular to the plane of FIGURE 10. Thus, with no deviation, at any given instant of time, equal amounts of light from beams 156A and 156B will pass scanner arms 163 and 164 respectively, regardless of the position of the scanner arms. Therefore, during a complete revolution of the scanner arms the magnitude of the maximum summation and the magnitude of the minimum summation of light from beams 156A and 156B falling on photomultiplier 161 will be equal in terms of absolute numbers but opposite in sign. Thus, the output of photomultiplier 161 would be a sinusoidal curve wherein the maximum and minimum points have magnitudes which are absolutely equal to one another but with opposite sign.

If the deviation of the collimator 151 is, for example counter clock-wise when looking along the direction of the beams of light, the light beam 156B would move in a direction downward with respect to the plane of FIGURE 10 while light beam 156A is moved in a direction upward with respect to the plane of FIGURE 10. Therefore, when the sensing edges of scanner arms 163 and 164 are in the plane of the paper the scanner arm 163 would, for example block out all light from beam 156A which is below the plane of FIGURE 10 while scanner arm 164 would block out all light from beam 156B which is above the plane of FIGURE 10. (See FIGURE 11.)

It should be noted that when there is rotation about the Z axis counter clock-wise as described above a greater portion of beam 156A will lie above the plane of FIGURE 10 while a greater portion of beam 156B will lie below the plane of FIGURE 10. Therefore, when the sensing edges of scanner arms 163 and 164 are in the plane of FIGURE 10 as described, a minimum summation of light from beams 156A and 156B will pass the scanner arms to strike photomultiplier 161. When the scanner rotates 180° whereby scanner arm 163 is above the plane of FIGURE 10 and scanner arm 164 is below the plane of FIGURE 10 a maximum summation of light from beams 156A and 156B will pass scanner arms 163 and 164 to strike the photomultiplier 161. This will result in the photomultiplier giving a sinusoidal output where the maximum and minimum amplitudes are not equal in the terms of absolute numbers.

These unequal summations of light striking the photomultiplier 161 will create different voltages across the photomultiplier which will be detected by amplifier 168, recorder 169 and indicator 170. Differential voltage detected by amplifier 168 will depend upon the difference in light intensity striking the photomultiplier 161 from light beams 156A and 156B, and consequently will be an indication of the rotation of the bodies about the Z axis.

The magnet 166 and armature 167 are utilized to indicate whether the deviation about the Z axis is clock-wise or counter clock-wise, since the magnet 166 and its poles rotate with the scanner 162 and act on the armature 167 which is connected to an electric circuit so as to indicate when the north and south poles pass the armature 167. Therefore, the orientation of the scanner arms 163 and 164 can be determined with respect to the maximum and the minimum points on the sinusoidal output curve. Therefore, the direction of rotation and deviation about the Z axis is determined. It should be noted that the scanner 162 allows maximum amounts of light from each of beams 156A and 156B to register together on the photomultiplier 161 while also allowing at a different instant the minimum amounts of light from beams 156A and 156B to be registered together.

The advantage of using a photomultiplier in a system of this nature is of course that one then need not be concerned with differential aging or variations in a multiplicity of photocells. Also converging the beams of light from 156A and 156B on the same point in the photomultiplier eliminates any variations in reading due to any eccentricities or variations in the photomultiplier. Of course, the converging prism could be eliminated if desired and the light directed onto the photomultiplier 161.

Registering of light is done on the photocells or photomultiplier and as is mentioned above is preferably done on the same area of the photomultiplier, in order to avoid error due to variation in sensitivity of various parts of any given photomultiplier. A signal generator can be connected to the armature which is operated by the magnet 166 and this signal generator operates in such a way that it can be known exactly when the maximum and minimum light is passing the scanner. The photomultiplier is connected to the electrical circuit for determination of rotations by difference between the summation of the maximum light passing the scanners and the summation of the minimum light passing the scanners which creates a maximum and minimum current in the photomultiplier.

The rotation of the scanner is at a very high r.p.m. approximately in the range to 6 to 10,000 revolutions per minute.

Thus it can be seen that utilization of the embodiment 150 of the present invention enables one to readily determine the deviations of two bodies about three mutually perpendicular axes X, Y, and Z, where the Z axes is coincident with or parallel to the line of sight of the collimator light.

Figure 12:
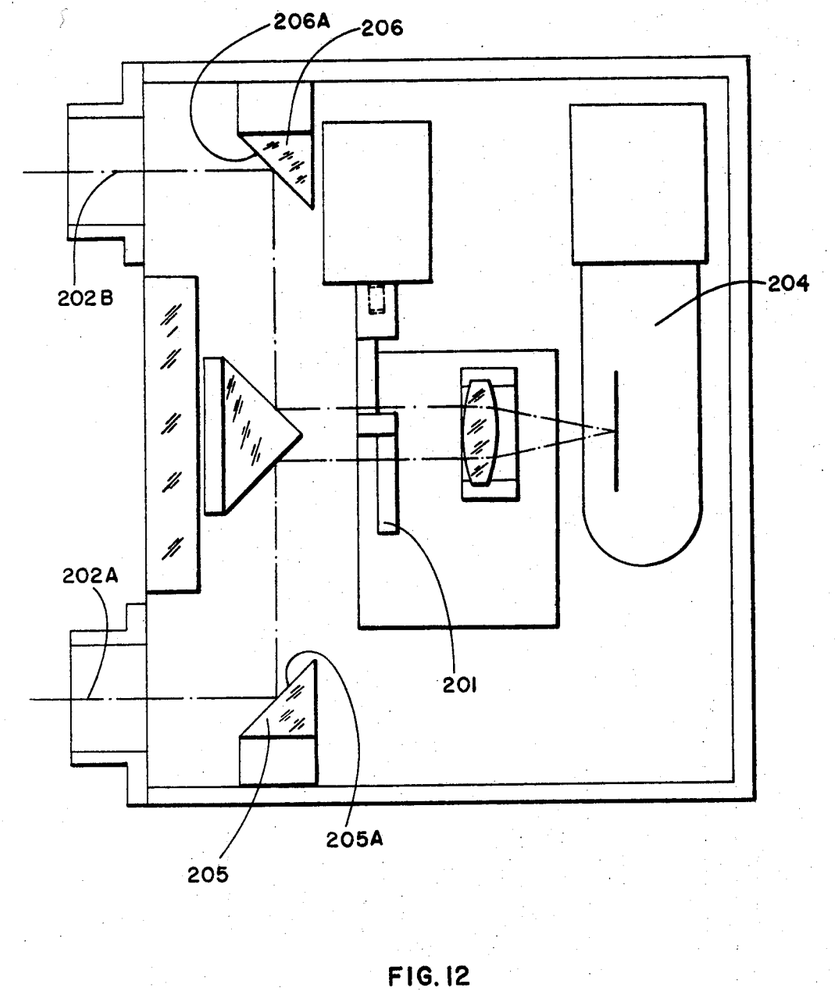
FIGURE 12 shows an alternative arrangement for the system shown in FIGURE 10.

FIGURE 12 shows an embodiment of the present invention similar to that in FIGURE 10 with the exception that the light scanner 201 does not comprise the sensing edge but merely allows light from beams 202A and 202B to alternately strike the photomultiplier 204. Prism 205 has a sensing edge 205A while prism 206 has sensing edge 206A. If there is no rotation about the Z axis equal amounts of light will fall above and below the sensing edges 205A, 206A and the light falling on photomultiplier 204 from light beams 202A and 202B will be absolutely equal in magnitude.

If there is rotation about the Z axis unequal amounts of light with fall above and below the sensing edge 205A and on equal amounts of light will fall above and below the sensing edge 206A. Therefore, the amount of light alternately passing scanner 201 and striking photomultiplier 204 will be different in magnitude.

The operation and use of the embodiment of FIGURE 12 is similar to that of FIGURE 10.

Figure 13:
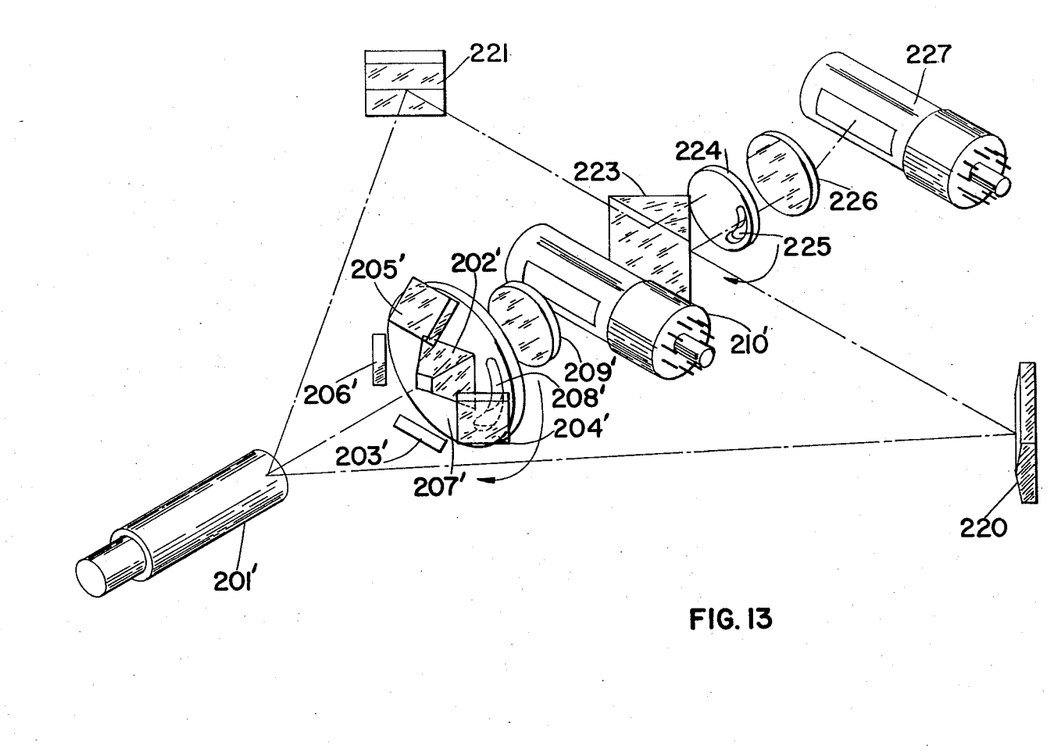
FIGURE 13 is an isometric of a system of the present invention utilizing disk scanners for determining deviations about three mutually perpendicular axes.

An isometric view of a system of the present invention for determining deviations about three mutually perpendicular axes is shown in FIGURE 13 and comprises a projecting means 201' which is similar to projecting means 2 of FIGURE 1, a square base truncated pyramidal prism 202' which is similar to prism 16 of FIGURE 1, four collecting reflectors 203', 204', 205' and 206' each disposed opposite one of the laterally inclined surfaces of prism 202', disc-shaped light scanner 207' having an opening 208' for allowing light to pass therethrough, a converging lens 209', and photoelectric means 210'. These described parts are utilized for determining deviation about the X and Y axes and operate as follows:

Collimated light from projecting means 201' superimposes a cross-shaped image of a reticle slit on the truncated end of pyramidal prism 202'. The image ends of the cross-arms overlap the truncated end of the prism 202' and are reflected from the laterally inclined surfaces to the collecting reflectors 203', 204', 205' and 206' opposite the respective laterally inclined surfaces. These reflectors direct the light toward the rotating disc scanner 207'. The hole 208' is such that it allows the passage of light from only one of the reflectors 203', 204', 205' and 206' to pass therethrough at any one time. The light passing through disc scanner 207' hits coverging lens 209' from which it is converged to a point on the photoelectric means 210'. Light from each of the four reflectors 203', 204', 205' and 206' is therefore successively converged on the same point of photoelectric means 210' which is connected to an electric circuit comprising an amplifier. The disc scanner 207' is connected to a phasing interpreter which is connected to the electric circuit so that at any given time it can be determined which of reflectors 203', 204', 205' and 206' is reflecting the light which is actuating the photoelectric means 210'. The electric circuit then allows a determination of deviation about the X and Y axes by comparing the light intensities from opposite pairs of photoelectric means 204', 206'; and 203', 205'.

For determination of deviation about the Z axis the invention of FIGURE 13 further comprises prisms 220 and 221 each of which has a sensing edge which divides the light beam striking it into two separate light beams. The two separate light beams from prism 220 and the two other separate light beams from prism 221 are brought to the collector prism 223 and all four light beams are diverted toward disc-shaped light scanner 224 having an opening 225 for passing light therethrough. The opening 225 in scanner 224 is such as to allow only one of the four beams of light from prism 223 to pass through scanner 224 at one time. Converging lens 226 converges each of these four beams of light successively on photoelectric means 227. Photoelectric means 227 emits pulses corresponding to the intensity of the successive light beams striking photoelectric means 227. The pulses are received by a demodulator which sends the pulses from the light beams from the upper portions of prisms 220 and 221 to a first inverter which inverts the value of the intensity of light from the upper portion of prism 220 and subtracts the intensity of light from the upper portion of prism 220 from the intensity of light from the upper portion of prism 221. Beams of light from the lower portions of prisms 220 and 221 are sent to another inverter where light from the lower portion of prism 221 is inverted and subtracted from the light value from the lower portion of prism 220. It is assumed herein that the disc 224 rotates in a clock-wise direction when looking from prism 223 toward disc 224.

The output of the system is the sum of the outputs of the two inverters and this gives the deviation in both magnitude and direction about the Z axis.

Among the advantages of the electro-optical system of the present invention are the following:

Relative deviation about an axis which is coincident with or parallel to the line of sight may be obtained while requiring only an optical path along the axis of rotation; the relative deviations of two bodies may be determined about three mutually perpendicular axes utilizing the same instrument thereby absolutely determining the geometric positions of the bodies; the accuracy of the electro-optical system itself can be checked; and the system has long term stability, better frequency response, greater angular range, and greater reliability than any instruments previously developed.

It is apparent that the described examples are capable of many variations and modifications within the scope of the present invention. All such variations and modifications are to be included within the scope of the present invention.

What is claimed is:

1. A deviation checking system for checking deviation of two bodies with respect to one another about three mutually perpendicular axes one of which is parallel to an axis passing through said bodies, comprising receiving means supported on one of said bodies for receiving light rays, projection means supported on the other of said bodies for projecting three separate beams of light to said receiving means, said receiving means comprising a square base truncated pyramidal prism having four laterally inclined surfaces and being disposed in the path of a cross-shaped beam of collimated light from said projection means so that the image of said cross-shaped beam of light is disposed on the square truncated end of said prism with the end portions of said cross-arms each extending onto a different one of said laterally inclined surfaces for determining the deviation about two of said mutually perpendicular axes which are perpendicular to said axis which is parallel to an axis passing through said bodies, and radially spaced light sensing means for determining the deviation about an axis parallel to an axis passing through said bodies and each comprising a prism having a sensing edge disposed in the path of a different one of two of said separate beams of light from said projection means so that the image of said beam of light is disposed partially on each side of said sensing edge, photoelectric means disposed opposite each of said laterally inclined surfaces and on each side of each of said sensing edges for receiving light rays reflected respectively from each of said laterally inclined surfaces and from each side of said sensing edges, whereby a deviation about an axis parallel to an axis passing through said bodies causes said beam images to move on said prisms across said sensing edges and to vary the amount of light reflected off said prisms on opposite sides of said sensing edges to said photoelectric means disposed opposite each side of each of said sensing edges, and whereby a deviation about either of said two mutually perpendicular axes which are perpendicular to said axis which is parallel to an axis passing through said bodies causes said cross-shaped beam to move on said pyrimidal prism and to vary the amount of light reflected off each of a pair of oppositely disposed laterally inclined surfaces to said respective photoelectric means disposed opposite said respective surfaces, and electric circuitry connected to said photoelectric means for indicating variations in the amount of light striking each of said photoelectric means, whereby the deviation of said points with respect to one another about each of the said three mutually perpendicular axes is determined.

2. A deviation checking system in accordance with claim 1, comprising an automatic rezeroing and recalibrating checking system including an independent source of light, a first reference reticle disposed in a path of light from said independent light source such that said first reticle is symmetrically illuminated on said square base truncated pyrimidal prism, and a second reference reticle so disposed in a path of light from said independent light source that said second reticle is symmetrically illuminated on said sensing edges, said independent light source and said reference reticles being optically disposed and calibrated to cause calibrated readings in said electric circuitry when said independent light source is the sole light in the system, timer control means connected to said independent light source and said projection means for causing said independent light source to be the sole light source in the system at selected intervals, whereby said photoelectric means are illuminated solely by said independent light source at said selected intervals, and means in said electric circuitry for determining the magnitude of voltages existing therein when said independent light source is the sole light source in the system and for trimming said electric circuitry to achieve calibrated voltages in said circuitry at such time, whereby the electric circuitry and photoelectric means is adjusted for any deviation from initial calibration.

3. A deviation checking system for checking two bodies with respect to one another about three mutually perpendicular axes one of which is parallel to an axis passing through said bodies comprising: reflecting means supported on a first of said two bodies, receiving means supported on the second of said two bodies for receiving light rays, projection means supported on the second of said two bodies for projecting three separate beams of light to said reflecting means from which reflecting means the three beams of light are reflected to said receiving means, all of said receiving means and said projection means being supported on the second of said two bodies, said receiving means comprising a square base truncated pyramidal prism having four laterally inclined surfaces and being disposed in the path of a cross-shaped beam of collimated light from said projection means so that the image of said cross-shaped beam of light is disposed on the square truncated end of said prism with the end portions of said cross-arms each extending onto a different one of said laterally inclined surfaces for determining the deviation about two of said mutually perpendicular axes which are perpendicular to said axis which is parallel to an axis passing through said bodies, and radially spaced light sensing means for determining the deviation about an axis parallel to an axis passing through said bodies and each comprising a prism having a sensing edge disposed in the path of a different one of two of said separate beams of light from said projection means so that the image of said beam of light is disposed partially on each side of said sensing edge, photoelectric means disposed opposite each of said laterally inclined surfaces and on each side of each of said sensing edges for receiving light rays reflected respectively from each of said laterally inclined surfaces and from each side of said sensing edges, whereby a deviation about an axis parallel to an axis passing through said bodies causes said beam images to move on said prisms across said sensing edges and to vary the amount of light reflected off said prisms on opposite sides of said sensing edges to said photoelectric means disposed opposite each side of each of said sensing edges, and whereby a deviation about either of said two mutually perpendicular axes which are perpendicular to said axis which is parallel to an axis passing through said bodies causes said cross-shaped beam to move on said pyrimidal prism and to vary the amount of light reflected off each of a pair of oppositely disposed laterally inclined surfaces respectively to said photoelectric means disposed opposite said inclined surfaces, and electric circuitry connected to said photoelectric means for indicating variations in the amount of light striking each of said photoelectric means, whereby light beams emitted by said projection means are reflected from said reflecting means back to said receiving means, whereby the deviation of said points with respect to one another about each of the said three mutually perpendicular axes is determined.

4. A deviation checking system for checking the angular deviation of two bodies about three mutually perpendicular axes one of which is parallel to an axis passing through said bodies comprising:

receiving means supported on one of said bodies for receiving light rays, projection means supported on the other of said bodies for projecting three separate beams of light to said receiving means, first light dividing and photoelectric sensing means on said one body to receive a first central beam of said three separate beams of light and sense lateral deviation movement of the first beam of light about two of said mutually perpendicular axes which are perpendicular to said axis which is parallel to an axis passing through said bodies, said first light dividing and photoelectric sensing means including two pairs of opposed light receiving portions with one light receiving portion of each pair being on one side of one of said two of said perpendicular axes and the other light receiving portion being on the other side of said one of said two perpendicular axes, the other pair of said light receiving portions of said first light dividing and photoelectric sensing means having one light receiving portion on one side of the other of said two perpendicular axes and the other of said light receiving portions being on the other side of said other of said two mutually perpendicular axes, said projection means including a light source, a reticle having a first slit, means on said projection means to collimate the image of the first slit of said reticle, means on said receiving means to direct the image of said first slit of said reticle onto said first light dividing and photoelectric sensing means, electric circuit means for providing an output indicative of the amount of said image received respectively by each of the said light receiving portions to indicate lateral deviation movement of said one beam of light rays about said two mutually perpendicular axes which are perpendicular to said axis which is parallel to said axis extending between said bodies whereby the first slit of said reticle when in alignment will focus on the center of said first light dividing and photoelectric sensing means, other slits in said projection means for producing the other two beams of light in diverging beams of uncollimated light in a plane extending toward said receiving means, a pair of radially spaced other light dividing and photoelectric sensing means on the one body to sense lateral movement of said two beams of uncollimated light to determine rotation about said axis which is parallel to said axis extending between said bodies, each of said pair of radially spaced other light dividing and photoelectric sensing means including a pair of opposed light receiving portions with one light receiving portion being on one side of said plane of said diverging beams and the other light receiving portion of each pair being on the other side of said plane of said diverging beams and electric circuitry connected to said light receiving portions for indicating variations in the amount of light striking each of said light receiving portions, whereby rotation about said axis which is parallel to said axis extending between said bodies can be accurately determined.

5. The invention according to claim 4 in which said first light dividing and photoelectric sensing means on said one body to sense lateral deviation movement about said two mutually perpendicular axes comprises:
a square base truncated pyramidal prism having four laterally inclined surfaces and a square top, and photoelectric cells in the path of light reflected from said inclined surfaces, said projection means including a light source, the first slit of said reticle being of cross shape, whereby a segment of the cross area of said cross-shape image may extend onto each of the inclined surfaces, for reflection to the photocells, whereby arcuate measure of angular alignment about two of the mutually perpendicular axes can be determined.

6. A deviation checking system for checking the angular deviation of two bodies about three mutually perpendicular axes one of which is parallel to an axis passing through said bodies comprising: reflecting means supported on one of said bodies for receiving and reflecting light rays, receiving means, and projection means supported on the other of said bodies, said projection means projecting three separate beams of light to said receiving means, first light dividing and photoelectric sensing means on said receiving means to sense lateral deviation movement of the first beam of light about two of said mutually perpendicular axes which are perpendicular to said axis which is parallel to an axis passing through said bodies, said first light dividing and photoelectric sensing means including two pairs of opposed light receiving portions with one light receiving portion of each pair being on one side of one of said two of said perpendicular axes and the other light receiving portion being on the other side of said one of said two perpendicular axes, the other pair of said light receiving portions of said first light dividing and photoelectric sensing means having one light receiving portion on one side of the other of said two perpendicular axes and the other of said light receiving portion being on the other side of said other of said two mutually perpendicular axes, said projection means including a light source, a reticle having a first slit, means on said projection means to collimate the image of the first slit of said reticle, means on said receiving means to direct the image of said first slit of said reticle onto said first light dividing and photoelectric sensing means, electric circuit means for providing an output indicative of the amount of said image received respectivelp by each of said light receiving portions to indicate lateral deviation movement of said one beam of light rays about said mutually perpendicular axes which are perpendicular to said axis which is parallel to said axis extending between said bodies whereby the first slit of said reticle when in alignment will focus on the center of said first light dividing and photoelectric sensing means, other slits in said projection means for producing the other two beams of light in diverging beams of uncollimated light in a plane extending toward said receiving means, a pair of radially spaced other light dividing and photoelectric sensing means on the other body to sense lateral movement of said two beams of uncollimated light to determine rotation about said axis which is parallel to said axis extending between said bodies, each of said pair of radially spaced light dividing and photoelectric sensing means including a pair of opposed light receiving portions with one light receiving portion being on one side of said plane of said diverging beams and the other light receiving portion of each pair being on the other side of said plane of said diverging beams and electric circuitry connected to said light receiving portions for indicating variations in the amount of light striking each of said light receiving portions, whereby rotation about said axis which is parallel to said axis extending between said bodies can be accurately determined.

References Cited

UNITED STATES PATENTS

| | | | |
|---|---|---|---|
| 2,361,973 | 11/1944 | Smith | 250—231 X |
| 2,378,744 | 6/1945 | Annen | 250—230 |
| 2,703,505 | 3/1955 | Senn | 88—14 |
| 2,792,748 | 5/1957 | Whitney et al. | 88—56 |
| 2,870,671 | 1/1959 | Falconi | 88—14 |
| 2,944,157 | 7/1960 | McAuslan et al. | 250—231 X |
| 2,952,779 | 11/1960 | Talley | 250—220 X |
| 2,978,589 | 4/1961 | Howell | 250—220 X |
| 3,021,749 | 2/1962 | Merlen | 88—14 X |
| 3,079,835 | 3/1963 | Saperstein | 250—220 X |

JEWELL H. PEDERSEN, *Primary Examiner.*

WILLIAM MISIEK, *Examiner.*

T. L. HUDSON, A. A. KASHINSKI,
*Assistant Examiners.*